US007673888B2

(12) United States Patent
Lauren et al.

(10) Patent No.: US 7,673,888 B2
(45) Date of Patent: Mar. 9, 2010

(54) COMBINED WHEELCHAIR, WALKER, AND SITTING CHAIR

(76) Inventors: Givi Lauren, 104-40 Queens Blvd., No. 17J, Forest Hills, NY (US) 11375; Irma Lauren, 104-40 Queens Blvd, No. 17J, Forest Hills, NY (US) 11375

(*) Notice: Subject to any disclaimer, the term of this patent is extended or adjusted under 35 U.S.C. 154(b) by 1251 days.

(21) Appl. No.: 11/053,971

(22) Filed: Feb. 9, 2005

(65) Prior Publication Data

US 2005/0156404 A1 Jul. 21, 2005

Related U.S. Application Data

(63) Continuation-in-part of application No. 10/359,492, filed on Feb. 7, 2003, now Pat. No. 6,921,101.

(51) Int. Cl.
*B62B 7/00* (2006.01)

(52) U.S. Cl. .................... 280/47.24; 280/642; 280/647; 280/650; 280/47.34; 280/47.4; 280/87.021; 280/87.05

(58) Field of Classification Search ................. 280/642, 280/647, 650, 47.34, 47.4, 87.021, 87.05; 135/65, 67, 85
See application file for complete search history.

(56) References Cited

U.S. PATENT DOCUMENTS

| | | | | | |
|---|---|---|---|---|---|
| 2,759,525 | A | * | 8/1956 | Ries | 297/6 |
| 3,708,182 | A | * | 1/1973 | Markiel | 280/288.4 |
| 4,384,713 | A | * | 5/1983 | Deutsch et al. | 482/68 |
| 4,415,198 | A | * | 11/1983 | Brearley | 297/6 |
| 4,461,471 | A | * | 7/1984 | Brastow | 482/68 |
| 4,748,994 | A | * | 6/1988 | Schultz et al. | 135/67 |
| 4,759,562 | A | * | 7/1988 | Vinyard et al. | 280/304.1 |
| 4,907,794 | A | | 3/1990 | Rose | |
| 5,172,715 | A | * | 12/1992 | Webb | 135/67 |
| 5,451,193 | A | | 9/1995 | Pickard | |
| 5,560,636 | A | * | 10/1996 | Chen | 280/642 |
| 5,605,345 | A | | 2/1997 | Erfurth et al. | |
| 5,647,602 | A | * | 7/1997 | Nevin | 280/87.021 |

(Continued)

OTHER PUBLICATIONS

PCT Notification of Transmittal of the International Search Report and the Written Opinion of the International Search Authority.

(Continued)

*Primary Examiner*—Paul N Dickson
*Assistant Examiner*—Katy Meyer
(74) *Attorney, Agent, or Firm*—Bernard S. Hoffman

(57) ABSTRACT

A supportive device for use as a wheelchair and a walker. A pair of handgrips are pivotally attached to a frame so as to have a rearwardly-facing position and a forwardly-facing position. A seat is pivotally attached to the frame so as to have a horizontal position and a vertical position. When using the supportive device as the wheelchair, a pair of front legs of the frame terminate in wheels, the seat is in the horizontal position thereof, and the pair of handgrips are in the rearwardly-facing position thereof. When the supportive device is used as the walker, the pair of front legs terminate in either wheels or caps, the seat is in the vertical position thereof, and the pair of handgrips are in the forwardly-facing position thereof.

34 Claims, 2 Drawing Sheets

U.S. PATENT DOCUMENTS 5,716,063 A * 2/1998 Doyle et al. ............. 280/87.05
5,772,234 A * 6/1998 Luo ........................... 280/642
5,816,593 A * 10/1998 Che ...................... 280/87.041
5,819,772 A 10/1998 Pi
6,311,708 B1 * 11/2001 Howle ......................... 135/67
6,338,355 B1 * 1/2002 Cheng ......................... 135/67
6,338,493 B1 1/2002 Wohlgemuth et al.
6,371,142 B1 * 4/2002 Battiston ..................... 135/67
6,378,883 B1 * 4/2002 Epstein .................... 280/250.1
6,494,469 B1 * 12/2002 Hara et al. ............. 280/87.041
6,990,990 B2 * 1/2006 Wilensky et al. .............. 135/67

OTHER PUBLICATIONS

PCT International Search Report.
PCT Written Opinion of the International Search Authority.

* cited by examiner

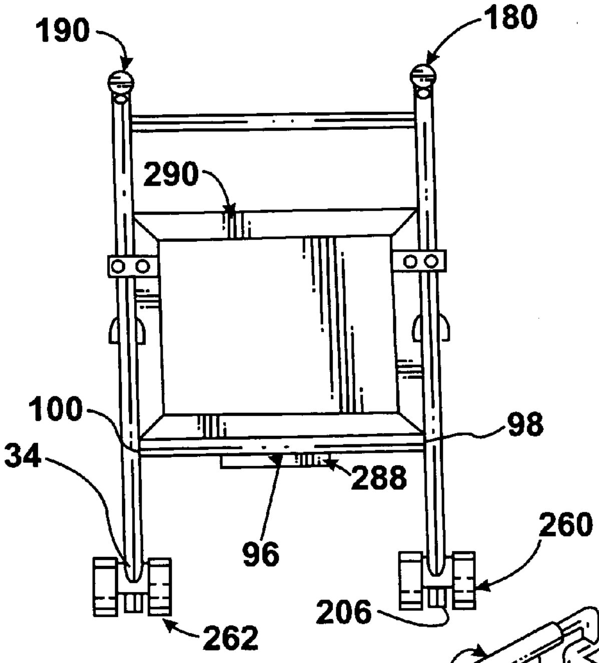
FIG. 3
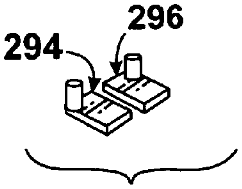
FIG. 5
FIG. 6
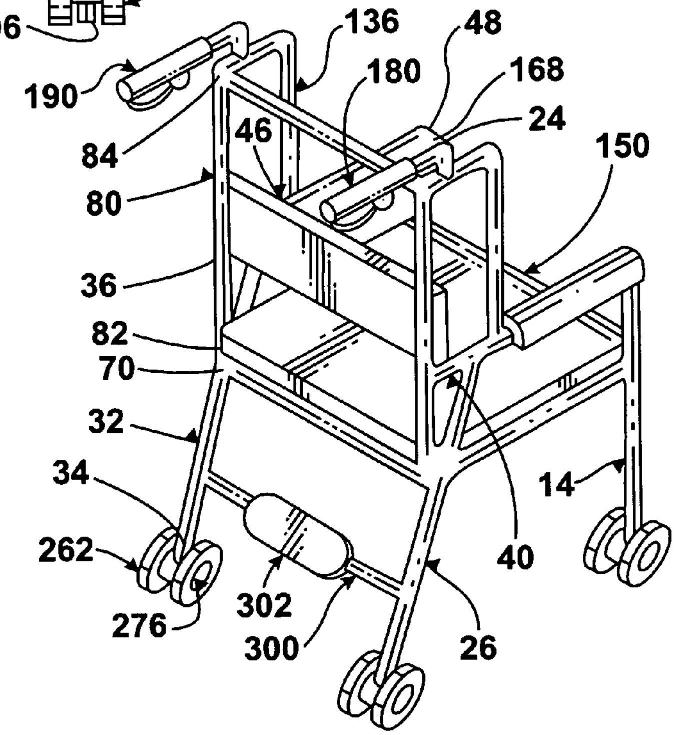
FIG. 4

COMBINED WHEELCHAIR, WALKER, AND SITTING CHAIR

CROSS REFERENCE TO RELATED APPLICATIONS

The instant non-provisional application is a Continuation application of non-provisional application Ser. No. 10/359,492, filed on Feb. 7, 2003, and entitled COMBINED WHEELCHAIR, WALKER, AND SITTING CHAIR.

BACKGROUND OF THE INVENTION

1. Field of the Invention

The present invention relates to the general art of chairs and seats, and to the particular field of interchangeable, occupant-propelled, and third party-assisted chairs and seats.

2. Discussion of the Related Art

Many people who require the use of a walker at times also require a wheelchair, and as with everyone, a sitting chair. Often, these people are required to own more than one device in order to fulfill their needs. Not only is this expensive, it may also be wasteful of space and may require the person to move from one device to another. Space may be an important consideration in nursing and adult homes, and the like, where many people may require use of such devices. This in turn often requires the assistance of another person, thereby inhibiting a person's mobility.

While today's walker-chairs offer some similar functionality, they offer neither the safety nor do they fully satisfy all of the needs of certain individuals who at times require the wheelchair function as well.

Therefore, there is a need for a combination device which is versatile. The device combines the functions of sitting, standing, ambulation assistance, and assisted and self-propelled transfer (via wheelchair functionality), to be most versatile.

Still further, many people have a balance problem. This may make getting into, or out of, a wheel-chair difficult. Some people may require the assistance of another person when getting into, or out of, presently available walker-chairs. If such an assistant is not available, the person may try to hold onto something outside of the chair, such as a table or the like. This may not be safe, especially if the person has a balance problem or is weak.

Therefore, there is a need for a combined device which makes getting into, or out of, the device as easy and safe as possible, without requiring the person to hold onto an object located outside the device (which in most cases are non-stationary objects which creates for an unsafe transfer). Armrests on the device provide the necessary safety and comfort feature currently lacking in today's devices. Anything other than armrests is inherently anatomically and physiologically incorrect for people with low balance and muscle weakness.

Due to their current structure, walker-chairs are not amenable for use at a table or at a desk because the front beams are not recessed and the chair cannot be pulled beneath the table or desk. If special designs for the tables or desks are required, comfort of the user of the walker-chair would be restricted or the user's mobility may be inhibited. Therefore, there is a need for a combined device which can be used in connection with presently existing tables and/or desks or the like.

SUMMARY OF THE INVENTION

Briefly stated, it is an object of the present invention to provide a supportive device for use as a wheelchair and a walker. The device includes a pair of handgrips, a seat, and a frame. The frame includes a back portion, a pair of side portions, a seat portion, a pair of rear legs, and a pair of front legs. The pair of rear legs of the frame terminate in wheels. The pair of front legs of the frame terminate in either wheels or caps. The pair of handgrips are pivotally attached to the pair of side portions of the frame, respectively, so as to have a rearwardly-facing position where they face away from the pair of front legs of the frame and a forwardly-facing position where they face towards the pair of front legs of the frame. The seat is pivotally attached to the seat portion of the frame so as to have a horizontal position where it faces the seat portion of the frame and a vertical position where it faces the back portion of the frame. The pair of front legs of the frame terminate in the wheels, the seat is in the horizontal position thereof, and the pair of handgrips are in the rearwardly-facing position thereof so as to allow a person to sit on the seat and face away from the back portion of the frame and have another person stand behind the person, grip the pair of handgrips, and push the supportive device so as to allow the supportive device to be used as the wheelchair. The pair of front legs of the frame terminate in either the wheels or the caps, the seat is in the vertical position thereof, and the pair of handgrips are in the forwardly-facing position thereof so as to allow a person to stand between the pair of side portions of the frame, face the back portion of the frame, grip the pair of handgrips, and push the supportive device so as to allow the supportive device to be used as the walker.

BRIEF DESCRIPTION OF THE DRAWING FIGURES

FIG. 3 is a rear elevational view of the combined device embodying the present invention with a back support pillow strapped thereto;

FIG. 4 is a perspective view of two caps that are used in the combined device of the present invention;

FIG. 5 is a perspective view of two foot rests that are used in the combined device of the present invention; and FIG. 6 is a rear perspective view of a combined device embodying the present invention with a foot pedal mounted on a lower cross brace.

LIST OF REFERENCE NUMERALS UTILIZED IN THE DRAWING

Figure 1:
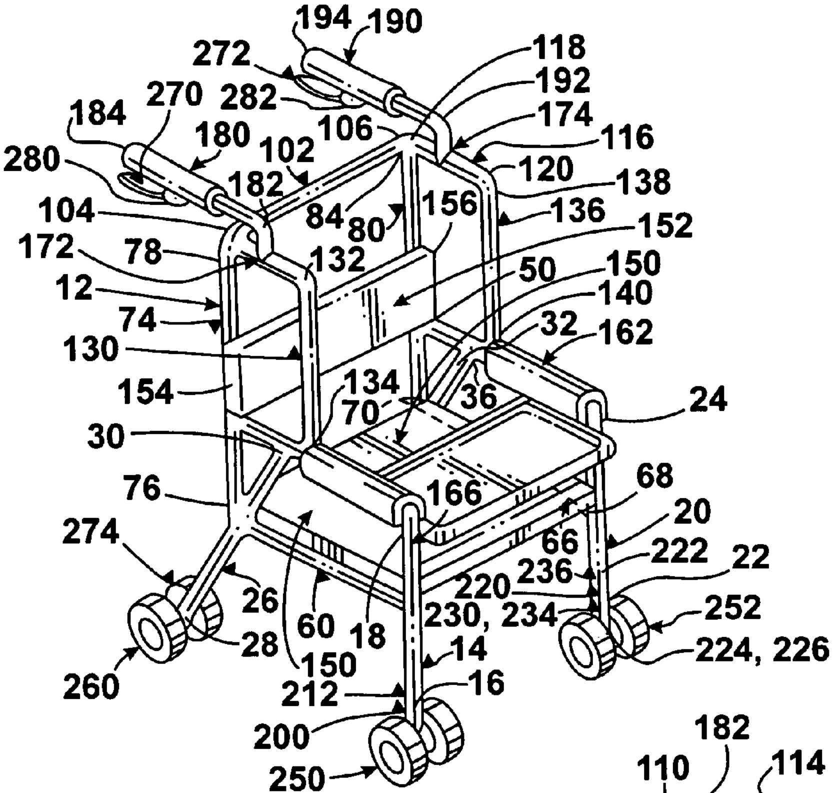
FIG. 1 is a front perspective view of the combined device embodying the present invention with wheel units on all legs thereof.

10 combined device
12 frame
14 first front leg of frame 12
16 first end of first front leg 14 of frame 12
18 second end of first front leg 14 of frame 12
20 second front leg of frame 12
22 first end of second front leg 20 of frame 12
24 second end of second front leg 20 of frame 12
26 first rear leg of frame 12
28 first end of first rear leg 26 of frame 12
30 second end of first rear leg 26 of frame 12
32 second rear leg of frame 12
34 first end of second rear leg 32 of frame 12
36 second end of second rear leg 32 of frame 12

40 first arm rest of frame 12
42 first end of first arm rest 40 of frame 12
44 second end of first arm rest 40 of frame 12
46 second arm rest of frame 12
48 first end of second arm rest 46 of frame 12
50 second end of second arm rest 46 of frame 12
60 first cross arm of frame 12
62 first end of first cross arm of frame 12
64 second end of first cross arm 60 of frame 12
66 second cross arm of frame 12
68 first end of second cross arm 66 of frame 12
70 second end of second cross arm 66 of frame 12
74 first back rest element of frame 12
76 first end of first back rest element 74 of frame 12
78 second end of first back rest element 74 of frame 12
80 second back rest element of frame 12
82 first end of second back rest element 80 of frame 12
84 second end of second back rest element 80 of frame 12
96 first rear cross brace of frame 12
98 first end of first rear cross brace 96 of frame 12
100 second end of first rear cross brace 96 of frame 12
102 second rear cross brace of frame 12
104 first end of second rear cross brace 102 of frame 12
106 second end of second rear cross brace 102 of frame 12
110 first top brace of frame 12
112 first end of first top brace 110 of frame 12
114 second end of first top brace 110 of frame 12
116 second top brace of frame 12
118 first end of second top brace 116 of frame 12
120 second end of second top brace 116 of frame 12
130 first support brace of frame 12
132 first end of first support brace 130 of frame 12
134 second end of first support brace 130 of frame 12
136 second support brace of frame 12
138 first end of second support brace 136 of frame 12
140 second end of second support brace 136 of frame 12
150 seat
152 back support
154 first end of back support 152
156 second end of back support 152
160 first arm rest cover
162 second arm rest cover
166 first tray mounting element
169 second tray mounting element
170 tray
172 first hand grip pivot mount
174 second hand grip pivot mount
180 first hand grip
182 proximal end of first hand grip 180
184 distal end of first hand grip 180
190 second hand grip
192 proximal end of second hand grip 190
194 distal end of second hand grip 190
200 first sleeve
202 first end of first sleeve 200
204 second end of first sleeve 200
206 cap of first sleeve 200
208 first lock
210 holes through first sleeve 200
212 button on first front leg 14
220 second sleeve
222 first end of second sleeve 220
224 second end of second sleeve 220
226 cap of second sleeve 220
230 second lock
234 holes through second sleeve 220
236 button on second front leg 20

250 first wheel unit
252 second wheel unit
260 first set of rear wheels
262 second set of rear wheels
270 first brake handle
272 second brake handle
274 first brake shoe
276 second brake shoe
280 first connection mechanism
282 second connection mechanism
288 weight
290 back support cushion
292 strap of back support cushion 290
294 first foot rest
296 second foot rest
300 lower cross brace
302 foot pedal

DETAILED DESCRIPTION OF THE PREFERRED EMBODIMENT

Other features and advantages of the invention will become apparent from a consideration of the following detailed description and the accompanying drawings.

The device embodying the present invention combines the functions of a wheelchair, a walker, and a sitting chair. In the interest of brevity, the combined wheelchair, walker, and sitting chair will be referred to herein as a device. As shown in the figures, the invention is embodied in a device 10.

The device 10 comprises a frame 12, which includes a first front leg 14, which extends vertically upward in a use orientation shown in FIG. 1, and has a first end 16 and a second end 18, with the first end 16 of the first front leg 14 of the frame 12 being located beneath the second end 18 of the first front leg 14 of the frame 12 in the use orientation.

The frame 12 further includes a second front leg 20, which extends vertically upward in the use orientation, and has a first end 22 and a second end 24, with the first end 22 of the second front leg 20 of the frame 12 being located beneath the second end 24 of the second front leg 20 of the frame 12 in the use orientation.

The frame 12 further includes a first rear leg 26, which extends upward at an oblique angle in the use orientation, and has a first end 28 and a second end 30, with the first end 28 of the first rear leg 26 of the frame 12 being located beneath the second end 30 of the first rear leg 26 of the frame 12 in the use orientation.

The frame 12 further includes a second rear leg 32, which extends upward at an oblique angle in the use orientation, and has a first end 34 and a second end 36, with the first end 34 of the second rear leg 32 of the frame 12 being located beneath the second end 36 of the second rear leg 32 of the frame 12 in the use orientation.

The frame 12 further includes a first arm rest 40, which connects the second end 18 of the first front leg 14 of the frame 12 to the second end 30 of the first rear leg 26 of the frame 12. The first arm rest 40 of the frame 12 has a first end 42 connected to the second end 18 of the first front leg 14 of the frame 12, and a second end 44 spaced-apart from the second end 30 of the first rear leg 26 of the frame 12, with the second end 30 of the first rear leg 26 of the frame 12 being connected to the first arm rest 40 of the frame 12, at a location between the first end 42 of the first arm rest 40 of the frame 12 and the second end 44 of the first arm rest 40 of the frame 12.

The frame 12 further includes a second arm rest 46, which connects the second end 24 of the second front leg 20 of the frame 12 to the second end 36 of the second rear leg 32 of the frame 12. The second arm rest 46 of the frame 12 has a first end 48 connected to the second end 24 of the second front leg 20 of the frame 12, and a second end 50 spaced-apart from the second end 36 of the second rear leg 32 of the frame 12, with the second end 30 of the first rear leg 26 of the frame 12 being connected to the second arm rest 46 of the frame 12, at a location between the first end 48 of the second arm rest 46 of the frame 12 and the second end 50 of the second arm rest 46 of the frame 12.

The frame 12 further includes a first cross arm 60, which connects the first front leg 14 of the frame 12 to the first rear leg 26 of the frame 12. The first cross arm 60 of the frame 12 has a first end 62 connected to the first front leg 14 of the frame 12, at a location between the first end 16 of the first front leg 14 of the frame 12, and the second end 18 of the first front leg 14 of the frame 12, and a second end 64 connected to the first rear leg 26 of the frame 12, at a location between the first end 28 of the first rear leg 26 of the frame 12 and the second end 30 of the first rear leg 26 of the frame 12. The first cross arm 60 extends parallel to the first arm 40.

The frame 12 further includes a second cross arm 66, which connects the second front leg 20 of the frame 12 to the second rear leg 32 of the frame 12. The second cross arm 66 of the frame 12 has a first end 68 connected to the second front leg 20 of the frame 12, at a location between the first end 22 of the second front leg 20 of the frame 12 and the second end 24 of the second front leg 20 of the frame 12, and a second end 70 connected to the second rear leg 32 of the frame 12, at a location between the first end 34 of the second rear leg 32 of the frame 12 and the second end 36 of the second rear leg 32 of the frame 12. The first cross arm 60 of the frame 12 extends parallel to the second arm 46 of the frame 12.

The frame 12 further includes a first back rest element 74, which has a first end 76 connected to the first rear leg 26, adjacent to the second end 64 of the first cross arm 60 of the frame 12, and extends vertically upward therefrom in the use orientation. The first back rest element 74 of the frame 12 has a second end 78 located above the first end 76 of the first back rest element 74 of the frame 12 in the use orientation.

The frame 12 further includes a second back rest element 80, which has a first end 82 connected to the second rear leg 32 of the frame 12, adjacent to the second end 70 of the second cross arm 66 of the frame 12, and extends vertically upward therefrom in the use orientation. The second back rest element 80 of the frame 12 has a second end 84 located above the first end 82 of the second back rest element 80 of the frame 12 in the use orientation.

The frame 12 further includes a first rear cross brace 96, which has a first end 98 connected to the first rear leg 26 of the frame 12, adjacent to the second end 64 of the first cross arm 60 of the frame 12, and a second end 100 connected to the second rear leg 32 of the frame 12. The first rear cross brace 96 of the frame 12, the first cross arm 60 of the frame 12, and the second cross arm 66 of the frame 12 are coplanar.

The frame 12 further includes a second rear cross brace 102, which has a first end 104 connected to the second end 78 of the first back rest element 74 of the frame 12, and a second end 106 connected to the second end 84 of the second back rest element 80 of the frame 12. The second rear cross brace 102 of the frame 12 is parallel to the first rear cross brace 96 of the frame 12.

The frame 12 further includes a first top brace 110, which has a first end 112 connected to the second end 78 of the first back rest element 74 of the frame 12, and a second end 114. The first top brace 110 of the frame 12 extends parallel to the first arm rest 40 of the frame 12.

The frame 12 further includes a second top brace 116, which has a first end 118 connected to the second end 84 of the second back rest element 80 of the frame 12, and a second end 120. The second top brace 116 of the frame 12 extends parallel to the second arm rest 46 of the frame 12.

The frame 12 further includes a first support brace 130, which has a first end 132 connected to the second end 114 of the first top brace 110 of the frame 12, and a second end 134 connected to the first arm rest 40 of the frame 12, at a location between the second end 30 of the first rear leg 26 of the frame 12 and the first end 42 of the first arm rest 40 of the frame 12. The first support brace 130 of the frame 12 extends vertically upward from the second end 134 of the first support brace 130 of the frame 12 to the first end 132 of the first support brace 130 of the frame 12 in the use orientation, as shown in FIG. 1.

The frame 12 further includes a second support brace 136, which has a first end 138 connected to the second end 120 of the second top brace 116 of the frame 12, and a second end 140 connected to the second arm rest 46 of the frame 12, at a location between the second end 36 of the second rear leg 32 of the frame 12 and the first end 48 of the second arm rest 46 of the frame 12. The second support brace 136 of the frame 12 extends vertically upward from the second end 140 of the second support brace 136 of the frame 12 to the first end 138 of the second support brace 136 of the frame 12 in the use orientation.

The device 10 further comprises a seat 150, which is mounted on the first rear cross brace 96 of the frame 12, the first cross arm 60 of the frame 12, and the second cross arm 66 of the frame 12.

The device 10 further comprises a back support 152, which has a first end 154 connected to the first back rest element 74 of the frame 12, at a location adjacent to the first arm rest 40 of the frame 12, and a second end 156 connected to the second back rest element 80 of the frame 12, at a location adjacent to the second arm rest 46 of the frame 12.

The device 10 further comprises a first arm rest cover 160, which is mounted on the first arm rest 40 of the frame 12, between the second end 134 of the first support brace 130 of the frame 12 and the first end 42 of the first arm rest 40 of the frame 12, and a second arm rest cover 162, which is mounted on the second arm rest 46 of the frame 12, between the second end 140 of the second support brace 136 of the frame 12 and the first end 48 of the second arm rest 46 of the frame 12.

The device 10 further comprises a first tray mounting element 166, which is mounted on the first arm rest 40 of the frame 12, and a second tray mounting element 168, which is mounted on the second arm rest 46 of the frame 12.

The device 10 further comprises a tray 170, which is mounted on the first and second tray mounting elements 166, 168 to support food, work, or the like, for a person sitting in the device 10.

The device 10 further comprises a first hand grip pivot mount 172, which is located on the first top brace 110 of the frame 12, and a second hand grip pivot mount 174, which is located on the second top brace 116 of the frame 12.

The device 10 further comprises a first hand grip 180, which has a proximal end 182 pivotally mounted in the first hand grip pivot mount 172, and a distal end 184 spaced-apart from the proximal end 182 of the first hand grip 180. The first hand grip 180 is pivotally movable between a use position, shown in FIG. 1, having the first back rest element 74 of the frame 12 located between the distal end 184 of the first hand grip 180 and the proximal end 182 of the first hand grip 180, and a stored position, shown in FIG. 2, having the first support brace 130 of the frame 12 located between the distal end 184 of the first hand grip 180 and the proximal end 182 of the first hand grip 180.

The device 10 further comprises a second hand grip 190, which has a proximal end 192 pivotally mounted in the second hand grip pivot mount 174, and a distal end 194 spaced-apart from the proximal end 192 of the second hand grip 190. The second hand grip 190 is pivotally movable between a use position, shown in FIG. 1, having the second back rest element 80 of the frame 12 located between the distal end 194 of the second hand grip 190 and the proximal end 192 of the second hand grip 190, and a stored position, shown in FIG. 2, having the second support brace 136 of the frame 12 located between the distal end 194 of the second hand grip 190 and the proximal end 192 of the second hand grip 190.

The device 10 further comprises a first sleeve 200, which is telescopingly connectable to the first front leg 14 of the frame 12. The first sleeve 200 has a first end 202, a second end 204, and a cap 206 on the second end 204 of the first sleeve 200.

The device 10 further comprises a first lock 208, which releasably connects the first sleeve 200 to the first front leg 14 of the frame 12, and has a plurality of holes, such as holes 210, defined through the first sleeve 200, with the holes 210 being spaced-apart from each other, from adjacent to the first end 202 of the first sleeve 200, toward the second end 204 of the first sleeve 200.

The device 10 further comprises a button 212 on the first front leg 14 of the frame 12, which is received in one of the plurality of holes 210 of the first sleeve 200 when the first sleeve 200 is connected to the first front leg 14 of the frame 12.

The device 10 further comprises a second sleeve 220, which is telescopingly connectable to the second front leg 20 of the frame 12, and has a first end 222, a second end 224, and a cap 226 on the second end 224 of the second sleeve 220.

The device 10 further comprises a second lock 230, which releasably connects the second sleeve 220 to the second front leg 20 of the frame 12, and has a plurality of holes, such as holes 234 defined through the second sleeve 220, with the holes 234 being spaced-apart from each other, from adjacent to the first end 222 of the second sleeve 220, toward the second end 224 of the second sleeve 220.

The device 10 further comprises a button 236 on the second front leg 20 of the frame 12. The button 236 is received in one of the plurality of holes 234 of the second sleeve 220 when the second sleeve 220 is connected to the second front leg 20 of the frame 12.

One form of the device 10 further comprises a third sleeve telescopingly connectable to the first front leg 14 of the frame 12. The third sleeve has a first end and a second end. This form also comprises a third lock releasably connecting the third sleeve to the first front leg 14 of the frame 12. The third lock has a plurality of holes defined through the third sleeve, with the holes being spaced-apart from each other, from adjacent to the first end of the third sleeve, toward the second end of the third sleeve. The button on the first front leg 14 of the frame 12 is received in one of the plurality of holes of the third sleeve when the third sleeve is connected to the first front leg 14 of the frame 12. This form further comprises a fourth sleeve telescopingly connectable to the second front leg 20 of the frame 12. The fourth sleeve has a first end and a second end. This form still further comprises a fourth lock, which releasably connects the fourth sleeve to the second front leg 20 of the frame 12. The fourth lock has a plurality of holes defined through the fourth sleeve, with the holes being spaced-apart from each other, from adjacent to the first end of the fourth sleeve, toward the second end of the fourth sleeve. The button on the second front leg 20 of the frame 12 is received in one of the plurality of holes of the fourth sleeve when the fourth sleeve is connected to the second front leg 20 of the frame 12.

The device 10 further comprises wheel units, such as a first wheel unit 250 and a second wheel unit 252, which can be connected to either the first and second sleeves 200, 220 or to the third and fourth sleeves, as desired.

The device 10 further comprises a first set of rear wheels 260, which is mounted on the first end 28 of the first rear leg 26 of the frame 12, and a second set of rear wheels 262, which is mounted on the first end 34 of the second rear leg 32 of the frame 12.

The device 10 further comprises a brake unit, which includes a first brake handle 270 on the first hand grip 180, and a second brake handle 272 on the second hand grip 190.

The device 10 further comprises a first brake shoe 274, which is on the first set of rear wheels 260, and a second brake shoe 276, which is on the second set of rear wheels 262.

The device 10 further comprises first connection mechanism 280, which operably connects the first brake handle 270 to the first brake shoe 274, and a second connection mechanism 282, which operably connects the second brake handle 272 to the second brake shoe 276. The brake connection mechanisms 280, 282 may include cables, joints, and the like, such as might be used to connect the hand brake of a bicycle to the brake shoes of the bicycle, as will be understood by those skilled in the art. Thus, the exact structure of the brake mechanisms will not be discussed in detail. Brakes can also be operated by a person sitting in the device 10 using straps or the like, as is known to those skilled in the art. The strap brakes can be used to provide further stability to the device 10 while the person is moving into or out of the device 10.

The first rear cross brace 96 of the frame 12, the first cross arm 60 of the frame 12, and the second cross arm 66 of the frame 12 are all located beneath the second ends 134, 140 of the first and second support braces 130, 136 of the frame 12, at a distance sufficient to locate a center of gravity of the frame 12 beneath the second ends 134, 140 of the first and second support braces 130, 136 of the frame 12.

The device 10 further comprises a weight, such as a weight 288, which can be included to further control the location of the center of gravity of the device 10 and thus increase the stability thereof.

Figure 2:
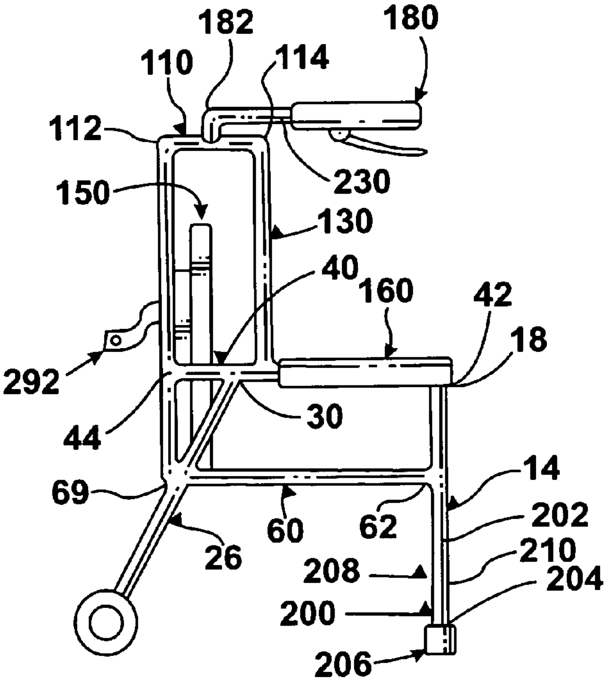
FIG. 2 is a side elevational view of the combined device embodying the present invention with caps on the two front legs thereof, the side opposite to the side shown in FIG. 2 being identical thereto.

Another form of the device 10 comprises a back support cushion 290 having straps, such as strap 292, which releasably engage the back support 152 when the back support cushion 290 is in place, as shown in FIG. 2. The back support cushion 290 assists in maintaining proper posture.

The device 10 may also comprise first and second foot rests 294 and 296, as shown in FIG. 5, mounted on the frame 12.

Yet another form of the device 10, shown in FIG. 6, comprises a lower cross brace 300 and a foot pedal 302 on the lower rear cross brace 300. The lower cross brace 300 and the foot pedal 302 provide further control of the device 10 for a person pushing the device 10.

It is understood that while certain forms of the present invention have been illustrated and described herein, it is not to be limited to the specific forms or arrangements of parts described and shown.

What is claimed and desired to be covered by Letters Patent is:

1. A supportive device for use as a wheelchair and a walker, comprising:

a) a pair of handgrips;

b) a seat; and c) a frame;

wherein said frame includes a back portion;

wherein said frame includes a pair of side portions;

wherein said frame includes a seat portion;
wherein said frame includes a pair of rear legs;
wherein said frame includes a pair of front legs;
wherein said pair of rear legs terminate in wheels;
wherein said pair of front legs terminate in one of wheels and caps;
wherein said pair of handgrips are pivotally attached to said pair of side portions of said frame, respectively, so as to have a rearwardly-facing position where said pair of handgrips face away from said pair of front legs of said frame and a forwardly-facing position where said pair of handgrips face towards said pair of front legs of said frame;
wherein said seat is pivotally attached to said seat portion of said frame so as to have a horizontal position where said seat faces said seat portion of said frame and a vertical position where said seat faces said back portion of said frame;
wherein when said pair of front legs of said frame terminate in said wheels, said seat is in said horizontal position thereof, and said pair of handgrips are in said rearwardly-facing position thereof so as to allow a person to sit on said seat and face away from said back portion of said frame and have another person stand behind the person, grip said pair of handgrips, and push said supportive device so as to allow said supportive device to be used as the wheelchair;
wherein when said pair of front legs of said frame terminate in one of said wheels and said caps, said seat is in said vertical position thereof, and said pair of handgrips are in said forwardly-facing position thereof so as to allow a person to stand between said pair of side portions of said frame, face said back portion of said frame, grip said pair of handgrips, and push said supportive device so as to allow said supportive device to be used as the walker;
wherein said pair of front legs of said frame have a first front leg;
wherein said first front leg of said frame extends vertically upwardly;
wherein said first front leg of said frame has a first end;
wherein said first front leg of said frame has a second end;
wherein said first end of said first front leg of said frame is located beneath said second end of said first front leg of said frame;
wherein said pair of front legs of said frame have a second front leg;
wherein said second front leg of said frame extends vertically upwardly;
wherein said second front leg of said frame has a first end;
wherein said second front leg of said frame has a second end;
wherein said first end of said second front leg of said frame is located beneath said second end of said second front leg of said frame;
wherein said pair of rear legs of said frame have a first rear leg;
wherein said first rear leg of said frame extends upwardly;
wherein said first rear leg of said frame has a first end;
wherein said first rear leg of said frame has a second end;
wherein said first end of said first rear leg of said frame is located beneath said second end of said first rear leg of said frame;
wherein said pair of rear legs of said frame have a second rear leg;
wherein said second rear leg of said frame extends upwardly;
wherein said second rear leg of said frame has a first end;
wherein said second rear leg of said frame has a second end;
wherein said first end of said second rear leg of said frame is located beneath said second end of said second rear leg of said frame;
wherein said pair of side portions of said frame have a first side portion;
wherein said first side portion of said frame has a first arm rest;
wherein said pair of side portions of said frame have a second side portion;
wherein said second side portion of said frame has a second arm rest; wherein said first arm rest of said frame connects said second end of said first front leg of said frame to said second end of said first rear leg of said frame;
wherein said first arm rest of said frame has a first end;
wherein said first end of said first arm rest of said frame is connected to second end of said first front leg of said frame;
wherein said first arm rest of said frame has a second end;
wherein said second end of said first arm rest of said frame is spaced-apart from said second end of said first rear leg of said frame; wherein said second end of said first rear leg of said frame is connected to said first arm rest of said frame, at a location between said first end of said first arm rest of said frame and said second end of said first arm rest of said frame;
wherein said second arm rest connects said second end of said second front leg of said frame to said second end of said second rear leg of said frame;
wherein said second arm rest of said frame has a first end;
wherein said first end of said second arm rest of said frame rest is connected to said second end of said second front leg of said frame;
wherein said second arm rest of said frame has a second end;
wherein said second end of said second arm rest of said frame is spaced-apart from said second end of said second rear leg of said frame; and
wherein said second end of said first rear leg of said frame is connected to said second arm rest of said frame, at a location between said first end of said second arm rest of said frame and said second end of said second arm rest of said frame.

2. The device as defined in claim 1, wherein said seat portion of said frame has a first cross arm;
wherein said seat portion of said frame has a second cross arm;
wherein said first cross arm of said frame connects said first front leg of said frame to said first rear leg of said frame;
wherein said first cross arm of said frame has a first end;
wherein said first end of said first cross arm of said frame is connected to said first front leg of said frame, at a location between said first end of said first front leg of said frame and said second end of said first front leg of said frame;
wherein said first cross arm of said frame has a second end;
wherein said second end of said first cross arm of said frame is connected to said first rear leg of said frame, at a location between said first end of said first rear leg of said frame and said second end of said first rear leg of said frame;
wherein said second cross arm of said frame connects said second front leg of said frame to said second rear leg of said frame;
wherein said second cross arm of said frame has a first end;

wherein said first end of said second cross arm of said frame is connected to said second front leg of said frame, at a location between said first end of said second front leg of said frame and said second end of said second front leg of said frame;

wherein said second cross arm of said frame has a second end; and wherein said second end of said second cross arm of said frame is connected to said second rear leg of said frame, at a location between said first end of said second rear leg of said frame and said second end of said second rear leg of said frame.

3. The device as defined in claim 2, wherein said first cross arm of said frame extends parallel to said first arm rest of said frame; and wherein said first cross arm of said frame extends parallel to said second arm rest of said frame.

4. The device as defined in claim 2, wherein said back portion of said frame has a first back rest element;

wherein said back portion of said frame has second back rest element;

wherein said first back rest element of said frame has a first end;

wherein said first end of said first back rest element of said frame is connected to said first rear leg of said frame, adjacent to said second end of said first cross arm of said frame;

wherein said first back rest element of said frame extends vertically upward from said first rear leg of said frame;

wherein said first back rest element of said frame has a second end;

wherein said second end of said first back rest element of said frame is located above said first end of said first back rest element of said frame;

wherein said second back rest element of said frame has a first end;

wherein said first end of said second back rest element of said frame is connected to said second rear leg of said frame, adjacent to said second end of said second cross arm of said frame;

wherein said second back rest element of said frame extends vertically upward from said second rear leg of said frame;

wherein said second back rest element of said frame has a second end; and wherein said second end of said second back rest element of said frame is located above said first end of said second back rest element of said frame.

5. The device as defined in claim 4, wherein said seat portion of said frame has a first rear cross brace;

wherein said first rear cross brace of said frame has a first end;

wherein said first end of said first rear cross brace of said frame is connected to said first rear leg of said frame, adjacent to said second end of said first cross arm of said frame;

wherein said first rear cross brace of said frame has a second end; and wherein said second end of said first rear cross brace of said frame is connected to said second rear leg of said frame.

6. The device as defined in claim 5, wherein said first rear cross brace of said frame, said first cross arm of said frame, and said second cross arm of said frame are coplanar.

7. The device as defined in claim 5, wherein said back portion of said frame has a second rear cross brace;

wherein said second rear cross brace of said frame has a first end;

wherein said first end of said second rear cross brace of said frame is connected to said second end of said first back rest element of said frame;

wherein said second rear cross brace of said frame has a second end; and wherein said second end of said second rear cross brace of said frame is connected to said second end of said second back rest element of said frame.

8. The device as defined in claim 7, wherein said second rear cross brace of said frame is parallel to first rear cross brace of said frame.

9. The device as defined in claim 5, wherein said first side portion of said frame has a first top brace;

wherein said second side portion of said frame has a second top brace;

wherein said first top brace of said frame has a first end;

wherein said first end of said first top brace of said frame is connected to said second end of said first back rest element of said frame;

wherein said first top brace of said frame has a second end;

wherein said second top brace of said frame has a first end;

wherein said first end of said second top brace of said frame is connected to said second end of said second back rest element of said frame; and wherein said second top brace of said frame has a second end.

10. The device as defined in claim 9, wherein said first top brace of said frame extends parallel to said first arm rest of said frame; and wherein said second top brace of said frame extends parallel to said second arm rest of said frame.

11. The device as defined in claim 9, wherein said first side portion of said frame has a first support brace;

wherein said second side portion of said frame has a second support brace;

wherein said first support brace of said frame has a first end;

wherein said first end of said first support brace of said frame is connected to said second end of said first top brace of said frame;

wherein said first support brace of said frame has a second end;

wherein said second end of said first support brace of said frame is connected to said first arm rest of said frame, at a location between said second end of said first rear leg of said frame and said first end of said first arm rest of said frame;

wherein said first support brace of said frame extends vertically upward from said second end of said first support brace of said frame to said first end of said first support brace of said frame;

wherein said second support brace of said frame has a first end;

wherein said first end of said second support brace of said frame is connected to said second end of said second top brace of said frame;

wherein said second support brace of said frame has a second end;

wherein said second end of said second support brace of said frame is connected to said second arm rest of said frame, at a location between said second end of second rear leg of said frame and said first end of said second arm rest of said frame; and wherein said second support brace of said frame extends vertically upward from said second end of said second support brace of said frame to said first end of said second support brace of said frame.

12. The device as defined in claim 11, further comprising:

a) a first arm rest cover; and b) a second arm rest cover;

wherein said first arm rest cover is mounted on said first arm rest of said frame, between said second end of said first support brace of said frame and said first end of said first arm rest of said frame; and wherein said second arm rest cover is mounted on said second arm rest of said frame, between said second end of said second support brace of said frame and said first end of said second arm rest of said frame.

13. The device as defined in claim 11, further comprising:

a) a first handgrip pivot mount; and b) a second handgrip pivot mount;

wherein said first handgrip pivot mount is located on said first top brace element of said frame; and wherein said second handgrip pivot mount is located on said second top brace element of said frame.

14. The device as defined in claim 13, wherein said pair of handgrips have a first handgrip;

wherein said first handgrip has a proximal end;

wherein said proximal end of said first handgrip is pivotally mounted in said first handgrip pivot mount;

wherein said first handgrip has a distal end;

wherein said distal end of said first handgrip is spaced-apart from said proximal end of said first handgrip; and wherein said first handgrip is pivotally movable between said rearwardly-facing position thereof, having said first back rest element of said frame located between said distal end of said first handgrip and said proximal end of said first handgrip, and said forwardly-facing position, having said first support brace of said frame located between said distal end of said first handgrip and said proximal end of said first handgrip.

15. The device as defined in claim 14, wherein said pair of handgrips have a second handgrip;

wherein said second handgrip has a proximal end;

wherein said proximal end of said second handgrip is pivotally mounted in said second handgrip pivot mount;

wherein said second handgrip has a distal end;

wherein said distal end of said second handgrip is spaced-apart from said proximal end of said second handgrip; and wherein said second handgrip is pivotally movable between said rearwardly-facing position thereof, having said second back rest element of said frame located between said distal end of said second handgrip and said proximal end of said second handgrip, and said forwardly-facing position, having said second support brace of said frame located between said distal end of said second handgrip and said proximal end of said second handgrip.

16. The device as defined in claim 15, wherein a brake unit has a first brake handle;

wherein said first brake handle of said brake unit is on said first handgrip;

wherein said brake unit has a second brake handle; and wherein said second brake handle of said brake unit is on said second handgrip.

17. The device as defined in claim 16, wherein a first brake shoe is on said first set of rear wheels; and wherein a second brake shoe is on said second set of rear wheels.

18. The device as defined in claim 17, wherein a first connection mechanism operably connects said first brake handle of said brake unit to said first brake shoe; and wherein a second connection mechanism operably connects said second brake handle of said brake unit to said second brake shoe.

19. The device as defined in claim 18, wherein said first brake connection mechanism is one of cables and joints; and wherein said second brake mechanism is one of cables and joints.

20. The device as defined in claim 11, wherein said first rear cross brace of said frame, said first cross arm of said frame, and said second cross arm of said frame are located beneath said second end of said first support brace of said frame and said second end of said second support brace of said frame, at a distance sufficient to locate a center of gravity of said frame beneath said second end of said first support brace of said frame and said second end of said second support brace of said frame.

21. The device as defined in claim 5, wherein said seat is mounted on said first rear cross brace of said frame;

wherein said seat is mounted on said first cross arm of said frame; and wherein said seat is mounted on said second cross arm of said frame.

22. The device as defined in claim 4, further comprising a back support;

wherein said back support has a first end;

wherein said first end of said back support is connected to said first back rest element of said frame, at a location adjacent to said first arm rest of said frame;

wherein said back support has a second end; and wherein said second end of said back support is connected to said second back rest element of said frame, at a location adjacent to said second arm rest of said frame.

23. The device as defined in claim 22, further comprising a back support cushion;

wherein said back support cushion has straps;

wherein said straps of said back support cushion releasably engage said back support when said back support cushion is in place; and wherein said back support cushion is for assisting in maintaining proper posture.

24. The device as defined in claim 13, further comprising:

a) a first tray mounting element; and b) a second tray mounting element;

wherein said first tray mounting element is mounted on said first arm rest of said frame; and wherein said second tray mounting element is mounted on said second arm rest of said frame.

25. The device as defined in claim 24, further comprising a tray;

wherein said tray is mounted on said first tray mounting element;

wherein said tray is mounted on said second tray mounting element; and wherein said tray is for supporting objects for a person sitting in said device.

26. The device as defined in claim 13, further comprising a first sleeve;

wherein said first sleeve is telescopingly connectable to said first front leg of said frame;

wherein said first sleeve has a first end;

wherein said first sleeve has a second end;

wherein said first sleeve has a cover; and wherein said cover of said first sleeve is on said second end of said first sleeve.

27. The device as defined in claim 26, further comprising:

a) a first lock; and b) a first button;

wherein said first lock releasably connects said first sleeve to said first front leg of said frame;
wherein said first lock has a plurality of holes;
wherein said plurality of holes are in said first sleeve;
wherein said plurality of holes are spaced-apart from each other, from adjacent to said first end of said first sleeve, toward said second end of said first sleeve; and
wherein said button on said first front leg of said frame is received in one of said plurality of holes in said first sleeve when said first sleeve is connected to said first front leg of said frame.

28. The device as defined in claim 26, further comprising a second sleeve;
wherein said second sleeve is telescopingly connectable to said second front leg of said frame;
wherein said second sleeve has a first end;
wherein said second sleeve has a second end;
wherein said second sleeve has a cover; and
wherein said cover of said second sleeve is on said second end of said second sleeve.

29. The device as defined in claim 28, further comprising:
a) a second lock; and
b) a button;
wherein said second lock releasably connects said second sleeve to said second front leg of said frame;
wherein said second lock has a plurality of holes;
wherein said plurality of holes are in said second sleeve;
wherein said plurality of holes are spaced-apart from each other, from adjacent to said first end of said second sleeve, toward said second end of said second sleeve;
wherein said button is on said second front leg of said frame; and
wherein said button is received in one of said plurality of holes in said second sleeve when said second sleeve is connected to said second front leg of said frame.

30. The device as defined in claim 28, wherein said wheels of said pair of front legs of said frame have a first wheel unit;
wherein said wheels of said pair of front legs of said frame have a second wheel unit;
wherein said first wheel unit is connected to said first sleeve; and
wherein said second wheel unit is connected to said second sleeve.

31. The device as defined in claim 13, wherein a first set of rear wheels is mounted on said first end of said first rear leg of said frame; and
wherein a second set of rear wheels is mounted on said first end of said second rear leg of said frame.

32. The device as defined in claim 13, further comprising a weight;
wherein said weight controls a location of a center of gravity of said device and thus increases stability thereof.

33. The device as defined in claim 1, further comprising:
a) a first foot rest; and
b) a second foot rest;
wherein said first foot rest is mounted on said frame; and
wherein said second foot rest is mounted on said frame.

34. The device as defined in claim 1, wherein said pair of rear legs of said frame have a lower cross brace;
wherein said pair of rear legs of said frame have a foot pedal;
wherein said foot pedal of said pair of rear legs of said frame is on said lower rear cross brace element of said pair of rear legs of said frame; and
wherein said lower cross brace of said pair of rear legs of said frame and said foot pedal of said pair of rear legs of said frame provide control of said device for a person pushing said device.

* * * * *